Patented Sept. 19, 1922.                                                1,429,589

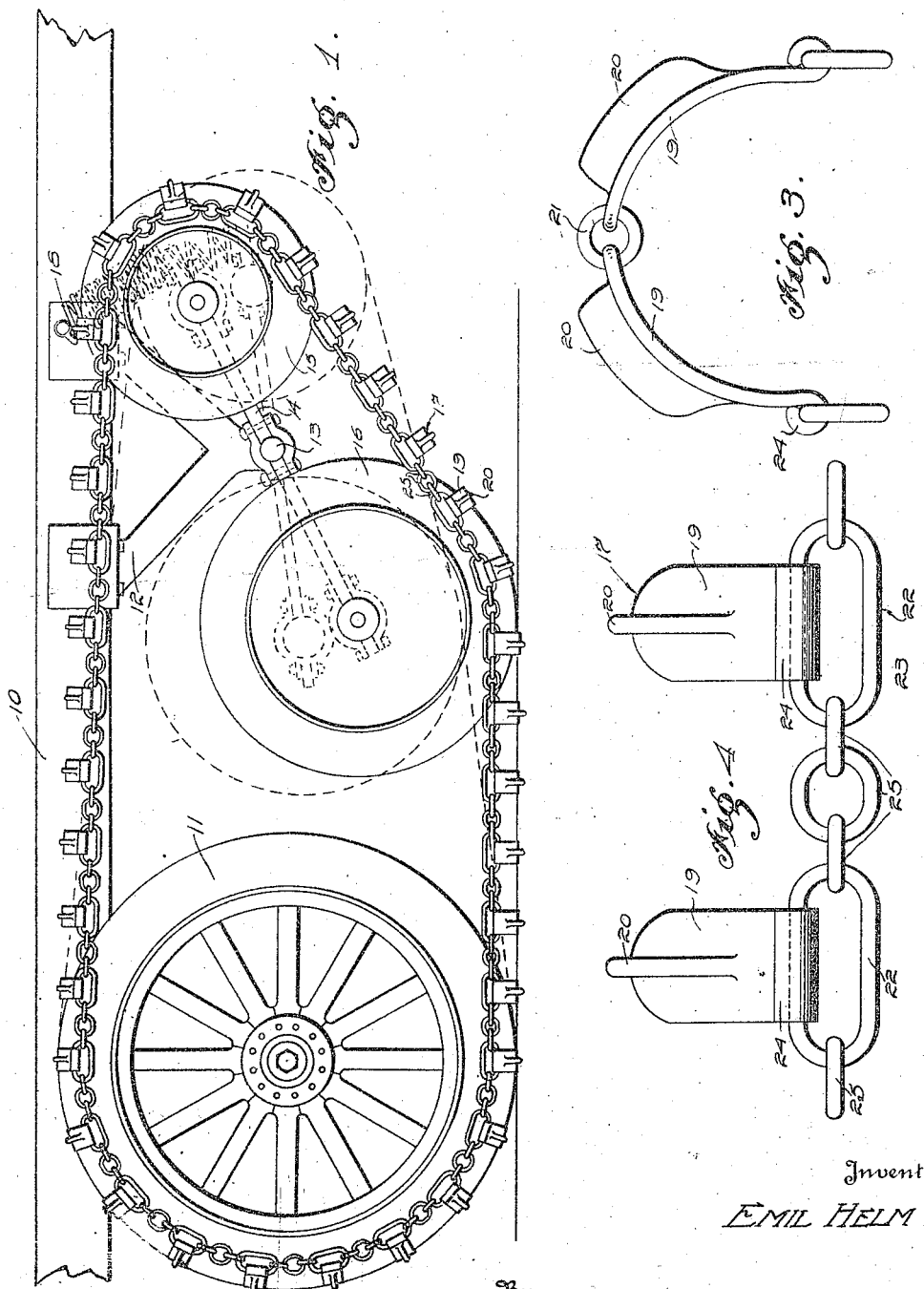

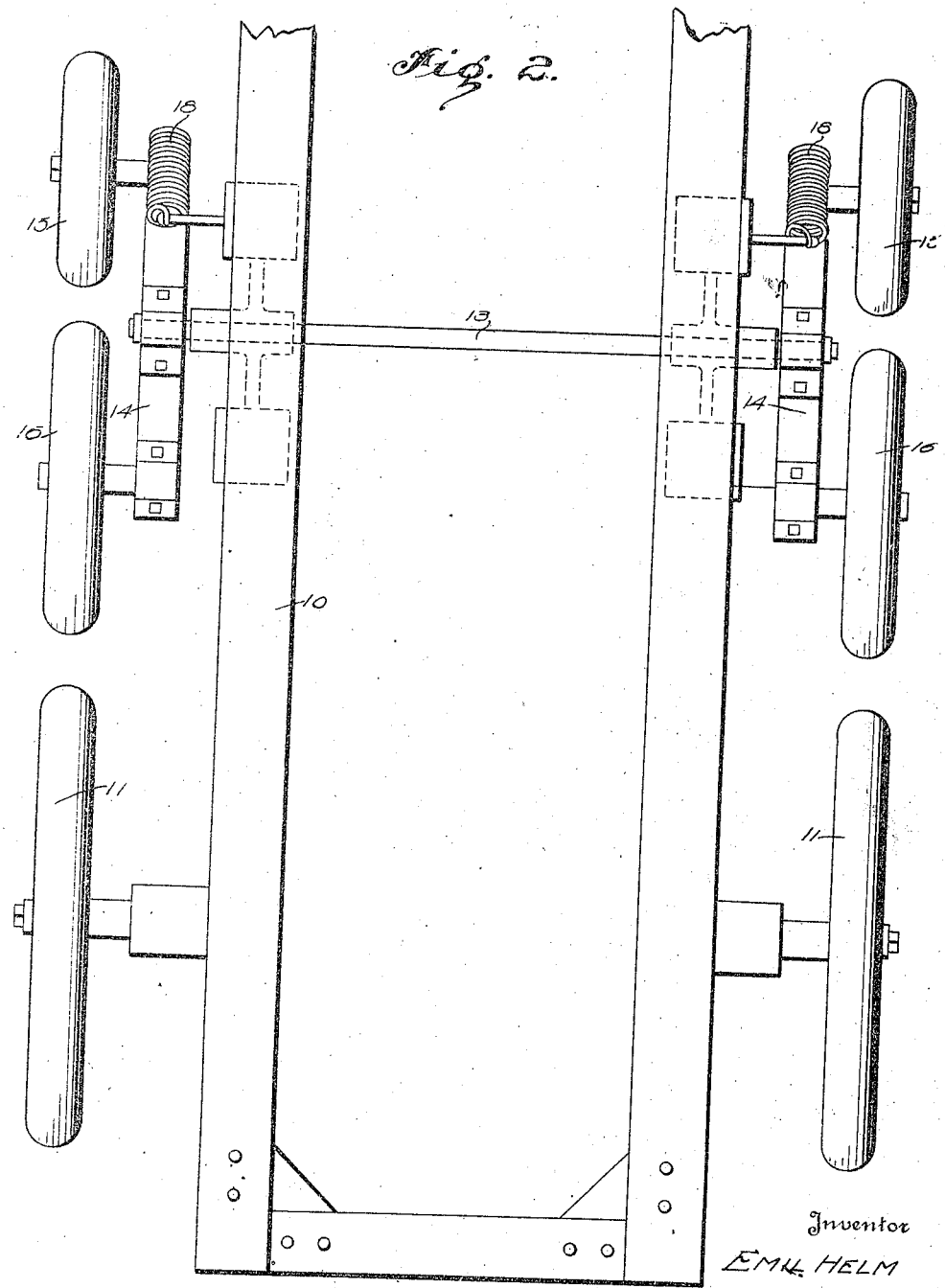

UNITED STATES PATENT OFFICE.

EMIL HELM, OF KITCHENER, ONTARIO, CANADA.

TRACTION DEVICE FOR VEHICLES.

Application filed April 23, 1920. Serial No. 376,107.

*To all whom it may concern:*

Be it known that I, EMIL HELM, a subject of the King of Great Britain, residing at Kitchener, in the Province of Ontario, and in the Dominion of Canada, have invented certain new and useful Improvements in Traction Devices for Vehicles, of which the following is a specification.

This invention relates to improvements in traction devices for power vehicles, and more particularly to a device for enabling motor trucks and the like to travel on roads where the ground is soft, without the driving wheels thereof digging themselves in.

A further object is to provide extra traction surface for vehicles of the above type when desired.

These and other objects I have attained by the combination and arrangement of parts shown in the accompanying drawings, wherein like numerals designate like parts, and wherein:

Figure 1 is a side elevation of the truck embodying my invention,

Figure 2 is a plan view thereof, the chain being removed for the purpose of clarity, Figure 3 is a side elevation of one of the traction chain units, and, Figure 4 is an edge elevation of a section of the chain enlarged.

Referring now more particularly to the drawings, the numeral 10 indicates a body frame of a truck, and the numeral 11 indicates the driving wheels thereof.

Secured to the body frame 10, forwardly of the driving wheels 11, are brackets 12 in which is mounted a shaft 13. The ends of the shaft project beyond the brackets 12, and have rotatably mounted thereon, supporting arms 14, extending longitudinally of the truck. The supporting arms 14 are provided upon their forward ends with idler wheels 15, and upon their rear ends with idler wheels 16. A flexible traction element 17 passes about the drive wheel 11, and the traction wheels 15 and 16, on each side of the truck. The spring 18 is secured to the forward end of each of the arms 14 and to the body frame 10 of the truck, normally holding their idler wheels and arms 14 in a position shown in Figure 1.

It will be seen that when the arms 14 and idler wheels 15 and 16 are in a position shown in Figure 1, the traction unit 17 engages the ground for a considerable length. Any suitable means may be provided, whereby the forward ends of the arms 14 may be moved downwardly against the action of the springs 18, and any suitable means may be provided for taking up the slack which may be formed in the flexible element 17, by moving the idler wheels and arms to this position.

While any suitable traction element may be employed, I have shown a traction element particularly adapted for use in this connection. This traction element comprises side plates 19, provided upon their outer surface with mud lugs 20 and secured together by links 21. The units thus formed are connected together by side chains 22, each comprising long links 23, about which the ends of the side plates 19 are bent, as at 24, and small links 25 connecting the long links.

To those familiar with the art, it will be obvious that the above structure is subject to many minor alterations, and must be so altered in applying it to motor vehicles of different types, and I accordingly do not limit myself to the specific structure hereinbefore set forth, but may make any such changes, without departing from the spirit of the invention, or the scope of the subjoined claims.

Having thus described my invention, I claim:

1. The combination with a motor vehicle embodying the usual body frame, and driving wheels carried by the frame, of a substantially straight supporting arm mounted on each side of said frame and pivoted forwardly of the axle of the drive wheels, idler wheels mounted on opposite ends of said arms, an endless flexible traction element passing about each pair of said idler wheels and the corresponding drive wheel, said arms being normally angularly arranged whereby one idler wheel of each pair normally contacts the ground, and resilient means for maintaining said arms in normal position.

2. The combination with a motor vehicle embodying a frame, and drive wheels carried by the frame, of substantially straight supporting arms pivotally mounted intermediate their ends on opposite sides of the vehicle frame, idler wheels carried by said supporting arms at each end thereof, an endless traction element surrounding each pair of idler wheels and their associated drive wheels, and resilient means for normally holding one idler wheel of each pair in contact with the ground and the other idler wheel of each pair out of contact with the ground.

3. In an endless tread tractor having an endless tread and a driving sprocket at the rear end and an idler sprocket at the forward end, an oscillating lever carrying said idler sprocket at its forward end and an idler trolley device at a point back of the pivot of said lever adapted to bear upon the inner face of the endless tread, and spring means tending to lift the forward end of said lever, the rear end of the lever carrying the idler trolley being free to move up and down independently of the rear driving sprocket.

In testimony whereof I affix my signature in presence of two witnesses.

EMIL HELM.

Witnesses:
ALLAN A. MOYER,
GERTRUDE HELM.